US010785348B2

(12) United States Patent
Shillingburg et al.

(10) Patent No.: US 10,785,348 B2
(45) Date of Patent: Sep. 22, 2020

(54) SEGMENT SIZE DETERMINATION

(71) Applicant: Hewlett Packard Enterprise Development LP, Houston, TX (US)

(72) Inventors: Mark Shillingburg, Roseville, CA (US); Jonathan M. Seely, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 202 days.

(21) Appl. No.: 15/689,644

(22) Filed: Aug. 29, 2017

(65) Prior Publication Data

US 2019/0068761 A1    Feb. 28, 2019

(51) Int. Cl.
*H04L 29/06*    (2006.01)
*H04W 24/08*    (2009.01)

(52) U.S. Cl.
CPC .......... *H04L 69/166* (2013.01); *H04L 69/168* (2013.01); *H04W 24/08* (2013.01)

(58) Field of Classification Search
CPC .................................................. H04L 69/166
See application file for complete search history.

(56) References Cited

U.S. PATENT DOCUMENTS

| | | | |
|---|---|---|---|
| 6,317,433 B1 | 11/2001 | Galand et al. | |
| 6,483,841 B1* | 11/2002 | Chang | ..................... H04L 29/06 370/412 |
| 6,882,625 B2 | 4/2005 | Le et al. | |
| 6,888,824 B1* | 5/2005 | Fang | ..................... H04L 49/103 370/359 |
| 7,023,841 B2 | 4/2006 | Dell et al. | |
| 7,363,572 B2* | 4/2008 | Sidenblad | ............... H04L 29/06 714/758 |
| 7,394,822 B2 | 7/2008 | Mathews et al. | |
| 7,515,612 B1* | 4/2009 | Thompson | .............. H04L 69/16 370/474 |
| 9,160,677 B2 | 10/2015 | Poole et al. | |
| 2003/0058802 A1* | 3/2003 | Jones | ...................... H04L 47/10 370/252 |
| 2003/0110271 A1* | 6/2003 | Jayam | ..................... H04L 47/10 709/228 |
| 2003/0110286 A1* | 6/2003 | Antal | ...................... H04L 47/36 709/236 |
| 2003/0115338 A1* | 6/2003 | Jayam | ................... H04L 69/329 709/228 |
| 2003/0152084 A1* | 8/2003 | Lee | ......................... H04L 47/10 370/395.21 |

(Continued)

OTHER PUBLICATIONS

Keith Sklower, et al., "The PPP Multilink Protocol (MP)," Network Working Group, Internet Draft, Jun. 15, 1996, 25 pages.

*Primary Examiner* — Andrew Lai
*Assistant Examiner* — Andrew C Lee
(74) *Attorney, Agent, or Firm* — Brooks Cameron & Huebsch, PLLC (57) ABSTRACT

Example implementations relate to segment size determination. In an example, the system may include a processing resource and a memory resource storing machine-readable instructions to cause the processing resource to determine a quantity of segments to be generated from a packet, and alter, in response to the determined quantity of segments and a memory block size of a destination port, a segment size for each of the quantity of segments.

19 Claims, 5 Drawing Sheets

(56) References Cited

U.S. PATENT DOCUMENTS

| | | | | |
|---|---|---|---|---|
| 2004/0213291 | A1* | 10/2004 | Beshai | H04L 47/36 370/473 |
| 2005/0058131 | A1* | 3/2005 | Samuels | H04L 41/00 370/389 |
| 2005/0204058 | A1* | 9/2005 | Philbrick | H04L 49/9021 709/238 |
| 2008/0056124 | A1* | 3/2008 | Nanda | H04L 29/06 370/229 |
| 2008/0056259 | A1* | 3/2008 | Miyamoto | H04J 3/0629 370/391 |
| 2008/0101476 | A1* | 5/2008 | Tian | H04N 19/152 375/240.26 |
| 2012/0297083 | A1* | 11/2012 | Ferguson | H04L 69/22 709/233 |
| 2014/0344410 | A1* | 11/2014 | Saremi | H04L 65/602 709/219 |
| 2016/0210050 | A1* | 7/2016 | Hyun | G06F 3/0659 |
| 2017/0237677 | A1* | 8/2017 | Zhao | H04L 47/6245 711/141 |

\* cited by examiner

SEGMENT SIZE DETERMINATION

BACKGROUND

A network may transfer information from a source to a destination. The network may route the information from ingress nodes to egress nodes. Mechanisms to monitor and influence the flow of information across the network may be utilized to monitor and influence the performance of the network.

DETAILED DESCRIPTION

A network may include a computing network. The network may include a data network including a digital telecommunications network to facilitate the sharing of resources among nodes connected to the network. The nodes may be able to exchange data, such as addressed packets. As used herein a packet (e.g., data packet) may include a formatted unit of data such as a list of bits or bytes carried by a packet-switched network. The packets may include a header and a payload and the header may be utilized by network hardware to direct the packet to its destination.

The nodes connected to the network may transmit packets through data link channels between the nodes. The data link may employ a variety of link layer technologies. In some examples, the network may utilize an Ethernet link layer technology for communicating packets among nodes. The data link may include a fabric link such as wired and/or wireless data link connecting nodes. The fabric link may have a variety of distinct architectures to accomplish the network of connections. Portions of the fabric link of the network may be contained within and/or connected to a network switch.

The network may utilize network switches to connect nodes and route packets between the nodes. A network switch may include a computing device that connects nodes such as computing devices together on the network by carrying out packet switching to receive, process, and forward data to nodes that are supposed to receive it instead of broadcasting the same data out to many nodes that are not the target of the data. The network switch may include an Ethernet network switch.

The network switch may utilize a variety of data transport mechanisms. In some examples, the network switch may receive a packet from a source port (e.g., a source node), and transmit the packet over fabric links (e.g., transmit the packet with a fixed path based on flow hash values). In some examples, packets are broken into a plurality of cells (e.g., with fixed size) and are distributed across a plurality of fabric links. In this example, the plurality of cells received at the destination port (e.g., a destination node) may need to be re-ordered and reassembled back into the packets.

In those examples, a significant congestion at fabric links and/or an ineffective utilization of fabric bandwidths can occur. For example, transmitting data as a single packet may often result in an imbalanced utilization of fabric links, in which a portion of the fabric links may experience a congestion while another portion of the fabric links may experience an underutilization. For example, transmitting packets as a plurality of cells may result in an underutilization of fabric links when a size of each packet is smaller than, for instance, a fixed size of a single cell. Further, reordering and reassembling the plurality of cells at the destination port often causes a significant delay.

Accordingly, example implementations relate to segment size determination. As detailed herein, a size for each segment determined in accordance with the disclosure may provide an effective utilization of fabric links and simplified reordering and reassembling of segments at a destination port; and hence, reducing delays associated with reordering and reassembling. In an example system, the system may include a processing resource and a memory resource storing machine-readable instructions to cause the processing resource to determine a quantity of segments to be generated from a packet, and alter, in response to the determined quantity of segments and a memory block size of a destination port, a segment size for each of the quantity of segments. As used herein, a segment refers to a unit of data derived from a corresponding packet and having a size that is smaller or equal to a size of the corresponding packet. In various examples, a quantity of (e.g., a plurality of) segments may be generated (e.g., derived) from a packet.

Figure 1:
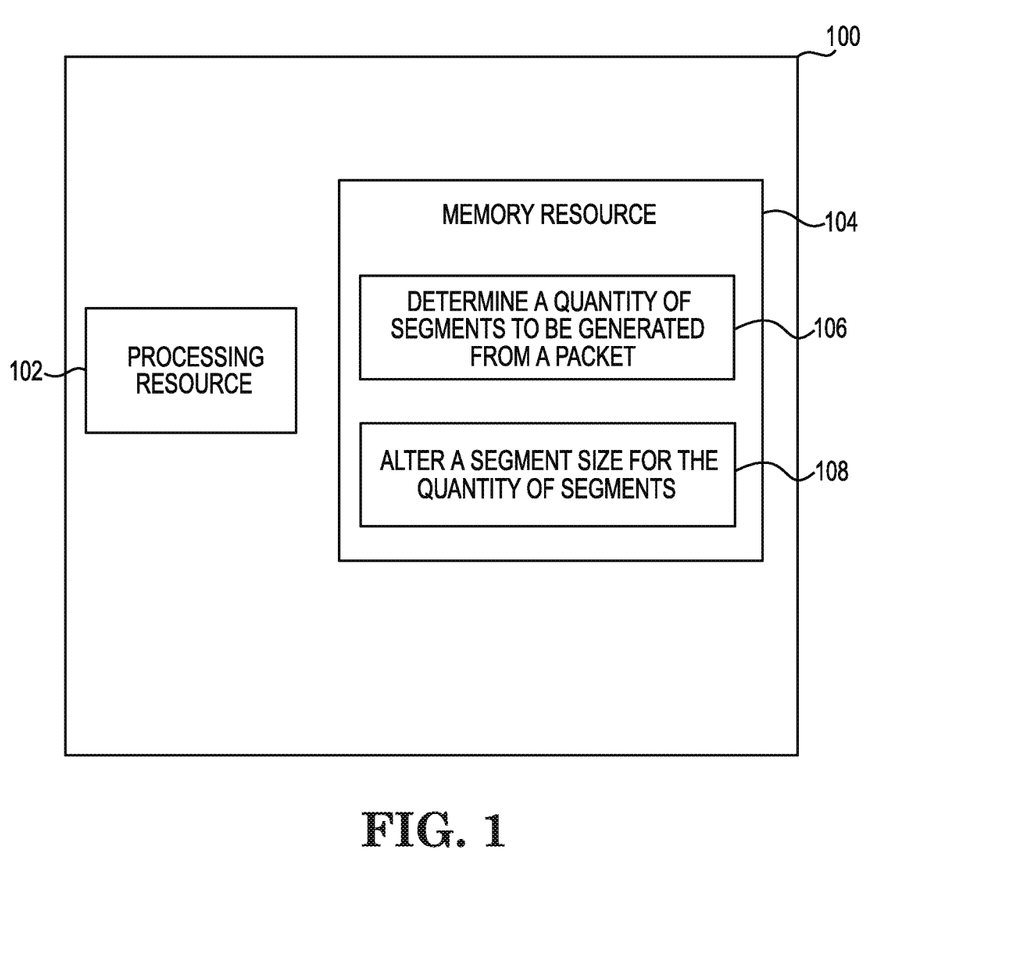
FIG. 1 illustrates an example of a system to determine a segment size in accordance with the disclosure.

FIG. 1 illustrates an example of a system 100 to determine a segment size in accordance with the disclosure. As illustrated herein, the system 100 may include a processing resource 102 and a memory resource 104 coupled to the processing resource 102. Instructions may be stored in the memory resource 104, such as instructions 106 and 108. Although the following descriptions refer to a single processing resource and a single memory resource, the descriptions may also apply to a system with multiple processing resources and/or multiple memory resources. In such examples, the instructions may be distributed (e.g., stored) across multiple memory resources and the instructions may be distributed across (e.g., executed by) multiple processing resources.

Processing resource 102 may be a central processing unit (CPU), a semiconductor based microprocessor, and/or other hardware devices suitable for retrieval and execution of instructions stored in memory resource 104. Processing resource 102 may fetch or retrieve, decode, and execute instructions 106 and 108, or a combination thereof. As an alternative or in addition to retrieving and executing instructions, processing resource 102 may include at least one electronic circuit that includes electronic components for performing the functionality of instructions 106 and 108, or a combination thereof.

Memory resource 104 can be volatile or nonvolatile memory. Memory resource 104 can also be removable (e.g., portable) memory, or non-removable (e.g., internal) memory. For example, memory resource 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM), flash memory, a laser disc, a digital versatile disk (DVD) or other optical disk storage, and/or a magnetic medium such as magnetic cassettes, tapes, or disks, among other types of memory.

In various examples, the system 100 may be a network switch (e.g., an Ethernet switch) that connects ports of the system 100 to other ports of other network switches and routes packets between the system 100 and the other network switches. For example, the network switch may utilize fabric links to route packets received from a source port to a destination port. As described herein, a fabric link may refer to a data link through which data packets are transmitted. In various examples, the fabric link may be a physical connection between ports. The network switch may include an ingress and an egress. An ingress may include an ingress interface where a packet from a source port enters the switch. The egress may include an egress interface where a packet exits the network switch and transmitted to a destination port.

Instruction 106, when executed by processing resource 102, may cause the processing resource 102 to determine a quantity of segments to be generated from a packet. In various examples, the quantity of segments may be determined in response to a target segment size and a packet size. For example, the packet size may be divided by the target segment size, and an integer determined in response to a value obtained from the division may be the quantity of segments, as described herein. In some examples, a target segment size may be a threshold that a segment size for each of the quantity of segments may not exceed.

A packet received at the system 100 may include a corresponding header such as a fabric transport header (FTH). Upon generating a quantity of segments from the packet, each of the quantity of segments may include a corresponding header such as a flexible forwarding header (FFH).

Instruction 108, when executed by processing resource 102, may cause the processing resource 102 to alter, in response to the determined quantity of segments and a memory block size of a destination port, a segment size for the quantity of segments. In various examples, the memory block size of the destination port may be a block size of a memory buffer located in the destination port and receives the quantity of segments on behalf of the destination port. In various examples, the memory block size of the destination port may be a block size of a memory buffer (of the destination port), which receives the quantity of segments on behalf of the destination port. The quantity of segments received at the memory buffer may be reordered and reassembled. Altering a segment size in response to, for example, a memory block size of a destination port may provide benefits such as simplifying reordering and reassembling of a quantity of segments at the destination port, among others. For example, segments having a segment size that is equal to a single or plural memory block size may be reassembled without a need to move a portion of a single segment among memory blocks. In contrast, segments having a segment size that is not equal (less or greater than) to a single or plural memory block size may be further involved with moving a portion of a single segment among memory blocks.

In various examples, the segment size may be altered to be in a range between the memory block size and the target segment size. That is, the altered segment size may equal to or greater than the memory block size, and may be less than or equal to the target segment size. In some examples, a packet that is less than the target segment size in terms of data size may be transmitted over a fabric link as a single segment. As such, examples in accordance with the disclosure may reduce underutilization.

Figure 2:
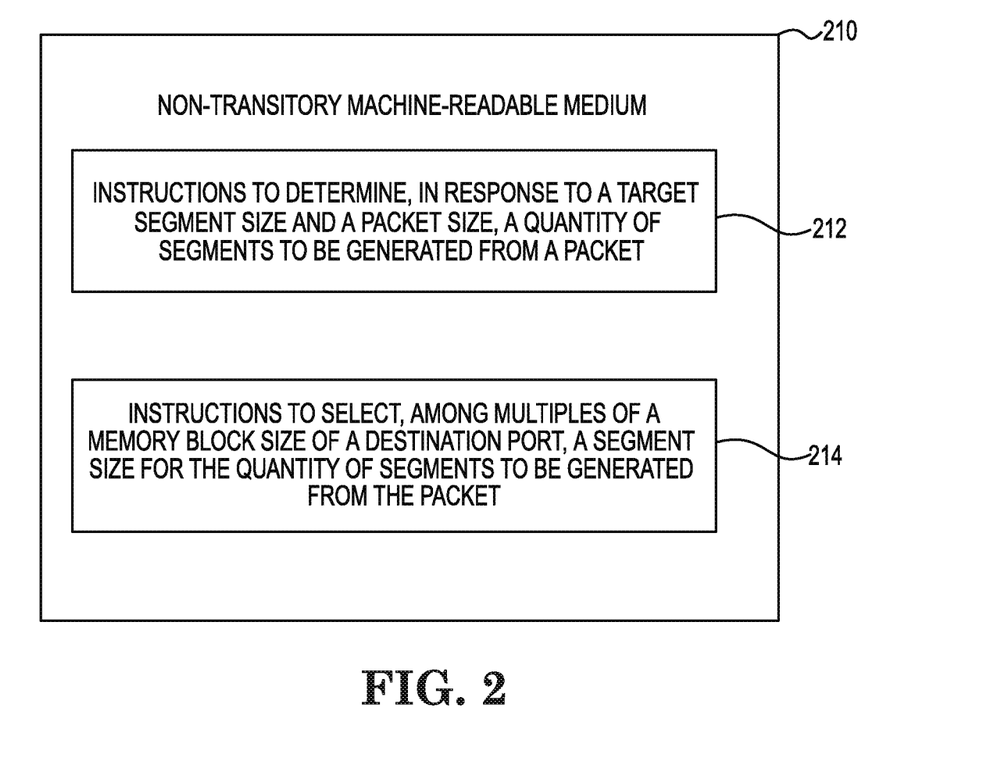
FIG. 2 illustrates an example non-transitory machine-readable medium to determine a segment size in accordance with the disclosure.

FIG. 2 illustrates an example non-transitory machine-readable medium 210 to determine a segment size in accordance with the disclosure. Non-transitory machine readable storage medium 210 may be an electronic, magnetic, optical, or other physical storage device that stores executable instructions. Thus, non-transitory machine readable storage medium 210 may be, for example, Random Access Memory (RAM), an Electrically-Erasable Programmable Read-Only Memory (EEPROM), a storage drive, an optical disc, and the like. Additionally and/or alternatively, non-transitory machine readable storage medium 210 may be a portable, external or remote storage medium that allows, for example, a computing system (e.g., system 100) to download the instructions from the portable/external/remote storage medium. In this situation, the executable instructions may be part of an "installation package". As described herein, non-transitory machine readable storage medium 210 may be encoded with executable instructions for a performance threshold.

The medium 210 may store instructions 212 executable by a processor to determine, in response to a target segment size and a packet size, a quantity of segments to be generated from a packet. In some examples, instructions 212 may include instructions to divide the packet size by the target segment size to generate a plurality of division values, and round up the plurality of division values to a corresponding integer, wherein the integer is determined to be the quantity of segments to be generated from the packet. For example, a packet having a packet size of 2500 bytes may be divided by a target segment size determined to be 1024 bytes. A plurality of division values (e.g., 2500/1024=2.44140625) may be rounded up to a corresponding integer, which is 3 in this example. As such, the quantity of segments to be generated from the packet is determined to be 3 in this example. As used herein, a round up may refer to replacing a number to the smallest integer that is greater than the number. For example, among integers that is greater than 2.44140625, 3 is the smallest integer. Similarly, a rounded up value of a number 2.111111 is 3.

The medium 210 may store instructions 214 executable by a processing resource to select, among multiples of a memory block size of a destination port, a segment size for each of the quantity of segments to be generated from the packet. As used herein, a multiple may refer to a number that can be divided by another number (e.g., the memory block size) without having a remainder. For example, when the memory block size of the destination port is equal to 256 bytes, the multiples of the memory block size may be a particular number selectable from 256 bytes, 512 bytes, 768 bytes, 1024 bytes, and so forth. Details with regards to determining one of the multiples of the memory block size to select is further described herein, for example, in relation to FIG. 3.

Having a segment size that is equal to one of the multiples of the memory block size of the destination port may simplify reordering and reassembling process at the destination port. Reordering and reassembling segments at a destination port may be relatively more complex if a segment size is not determined in response to a memory block size of a destination port. Consider segments having a segment size that is not equal to (e.g., less or greater than) a single or multiples of a memory block size of a destination port. In this example, a plurality of segments and/or portions of single segment may be stored in a single memory block in a non-orderly manner. As such, reordering the segments may be further involved with moving the plurality of segments and/or portions of the single segment among the memory blocks to reassemble those to a packet. Therefore, such a segment size may result in increased latencies involved with reordering and reassembling segments. In contrast, reordering process in accordance with the disclosure can be more efficient when a segment size is equal to a size of a single block or a plurality of blocks of a memory buffer. As such, the destination port may reorder the quantity of segments or most of the quantity of segments without a need to move a portion of a single segment among blocks. Thus, a segment size determined in accordance with the disclosure may substantially reduce the latencies involved with reordering and reassembling segments.

Figure 3:
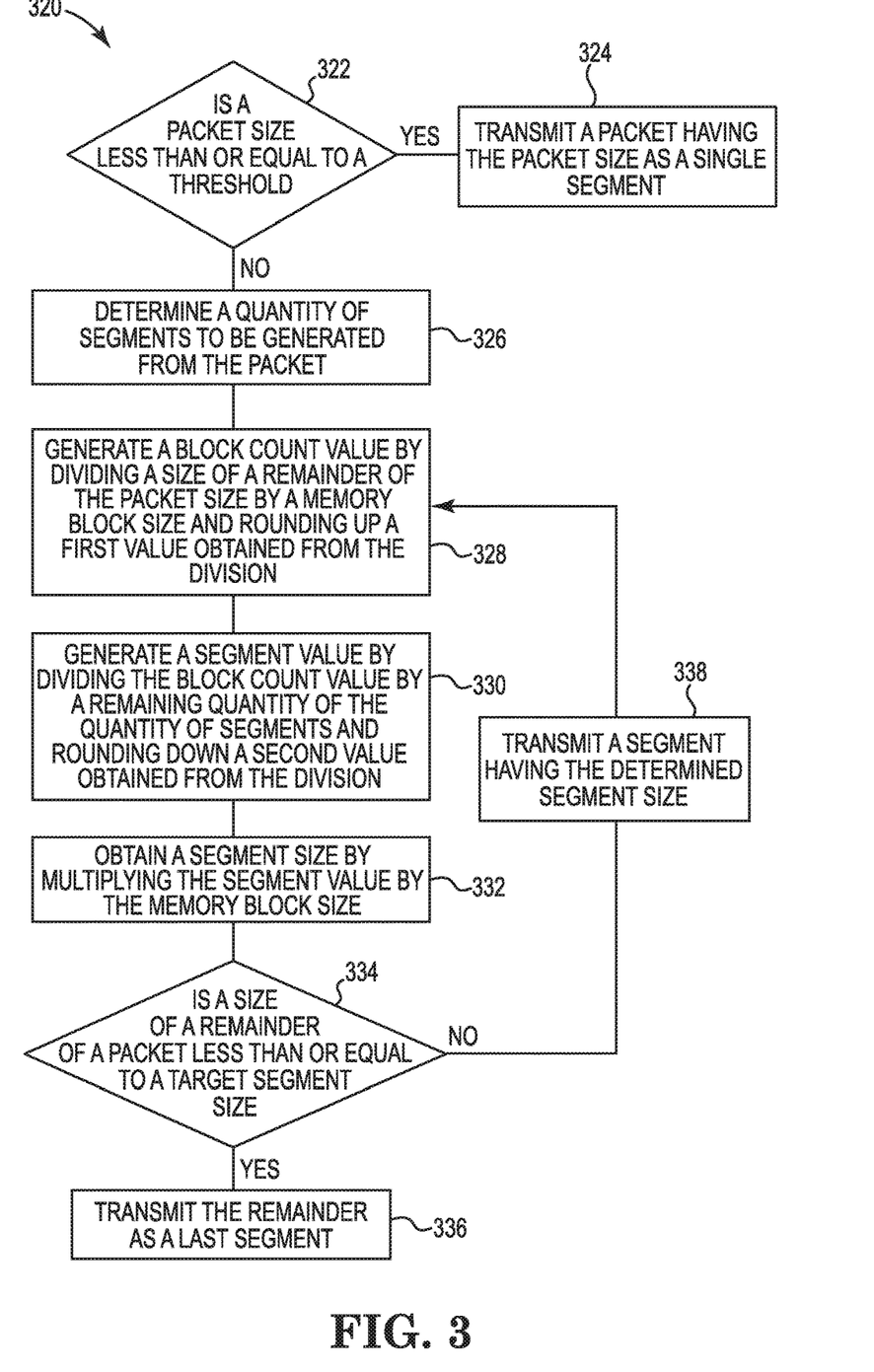
FIG. 3 illustrates an example flow diagram to determine a segment size in accordance with the disclosure.

FIG. 3 illustrates an example flow diagram 320 to determine a segment size in accordance with the disclosure. In some examples, the flow diagram 320 can be executed by a computing device or network device as described herein. For example, the flow diagram 320 can be executed by system 100 as referenced in FIG. 1. At block 322, a determination is made whether a packet size of a packet is less than a threshold. In various examples, the threshold may be a target segment size. As such, at block 322, the determination may be made whether the packet size of the packet is less than or equal to the target segment size.

When the packet size of the packet is less than or equal to the threshold, the flow diagram 320 may proceed to block 324, in which the packet is transmitted as a single segment over a fabric link. When the packet size of the packet is neither less than nor equal to the threshold, the flow diagram 320 may proceed to block 326.

At block 326, a quantity of segments (e.g., total quantity of segments) to be generated from a packet may be determined, as described herein, for example in relation to FIG. 2. For example, a packet size may be divided by a target segment size to generate a plurality of division values, and the plurality of division values may be rounded up to a corresponding integer, wherein the integer may be determined to be the quantity of segments to be generated from the packet.

At block 328, a size of a remainder of the packet size may be divided by the memory block size to generate a first value, and the first value is rounded up to an integer to generate a block count value. As used herein, a remainder of a packet may refer to a portion of the packet that is yet to be segmented. Consider an example described in relation to FIG. 2, in which a packet size is 2500 bytes, a target segment size is 1024 bytes, a memory block size of a destination port is 256 bytes, and a quantity of segments is determined to be 3. In this example, the first value is equal to 9.765625 (e.g., 2500/256=9.765625), and is rounded up to an integer (e.g., block count value) that is equal to 10. The size of the remainder is equal to 2500 in this example because none of the quantity of segments has been generated from the packet yet. In various examples, the block count value may indicate how many blocks, for example, of a memory buffer of a destination port are to be utilized in receiving the quantity of segments.

At block 330, the block count value may be divided by a remaining quantity of the quantity of segments to generate a second value, and the second value is rounded down to an integer to generate a segment value. For example, the block count value of 10 may be divided by a remaining quantity that is equal to 3. In this example, the remaining quantity is equal to 3 since none of the quantity of segments has been generated from the packet yet. In this example, the second value is equal to 3.333 . . . (e.g., 10/3=3.333 . . . ), and is rounded down to an integer (e.g., segment value) that is equal to 3. As used herein, a round down may refer to replacing a number with the largest integer that is less than the number. For example, among integers less than 3.333 . . . , 3 is the largest integer.

At block 332, the segment value may be multiplied by the memory block size to obtain a segment size, for example, for a first segment. For example, the segment size value determined to be 3 may be multiplied by the memory block size 256 bytes. In this example, the segment size is 768 bytes (e.g., 256*3=768), and as such, a size of the first segment is determined to be 768 bytes.

At block 334, a determination is made as to whether the size of the remainder is less than or equal to the target segment size. For example, subsequent to generating the first segment having 768 bytes, the size of the remainder equal to 1732 bytes (e.g., 2500−768=1732) may be compared to the target segment size equal to 1024 bytes. Since the size of the remainder is neither less than nor equal to the target segment size, the flow diagram 320 may proceed to a block 338. At block 338, a segment having the determined segment size (e.g., 768 bytes) may be generated from the packet and transmitted to the destination port. Upon and/or simultaneously with transmitting the segment, the flow diagram 320 may proceed back to the block 328 to determine another segment size, for example, for a second segment.

In various examples, until the size of the remainder becomes equal to or less than the target segment size, blocks 328, 330, and 332 may be repeated to determine a segment size for each segment. In above example, in which the first segment having 768 bytes is generated, a second segment may be generated by repeating blocks 328, 330, and 332. For example, for the second segment, the block count value may be determined to be 7 (1732/256=6.765625, and 6.765625 is rounded up to 7), and the segment value may be determined to be 3 (7/2=3.5, and 3.5 is rounded down to 3). In this example, the remaining quantity of the quantity of segments may be equal to 2 because only one segment has been generated from the quantity of segments that is determined to be 3. As such, the memory block size (256 bytes) may be multiplied by the segment value (3), and the second segment may be determined to be 768 bytes (e.g., 256*3=768).

Subsequent to generating the second segment (e.g., at block 338), the size of the remainder is equal to 964 bytes (e.g., 2500−768−768=964). As such, at block 334, it is determined that the size of the remainder (e.g., 964 bytes) is less than the target segment size (e.g., 1024 bytes). In response to the determination that the size of the remainders less than the target segment size, the flow diagram 320 may proceed to block 336 rather than to block 338.

At block 336, the remaining quantity of the packet may be transmitted as a last segment (e.g., in response to the determination that the size of the remainder is less than or equal to the target segment size). For example, a third segment having a size of 964 bytes that is less than the target segment size (e.g., 1024 bytes) may be transmitted as a last segment.

As such, in this example, three segments may be generated each having 768, 768, and 964 bytes, respectively. A block count value, a segment value, and a segment size for each segment is summarized as follows:

|  | Block Count Value | Segment Value | Segment Size |
|---|---|---|---|
| First Segment | 10 | 3 | 768 |
| Second Segment | 7 | 3 | 768 |
| Third Segment | N/A | N/A | 964 |

In various examples, a size difference (non-zero difference) between two of the quantity of segments is less than the memory block size. For example, a size difference between a third segment and a first segment (e.g., 964−768=196) is less than the memory block size of 256 bytes. As such, latencies involved with a segment that may not be equal to a memory block size may be reduced.

Similarly, the flow diagram 320 may be applicable to a packet having a different packet size, for example, of 2568 bytes as follows:

|  | Block Count Value | Segment Value | Segment Size |
|---|---|---|---|
| First Segment | 4 | 3 | 768 |
| Second Segment | 4 | 4 | 1024 |
| Third Segment | N/A | N/A | 776 |

In this example, 3 segments are generated from the packet, and each segment has a segment size of 768, 1024, and 776 bytes, respectively. Even when all of the quantity of segments have a different segment size, a difference between two of the quantity of segments is still equal to or less than a memory block size. For example, a difference between the first and the second segments is 256 bytes, a difference between the second and the third segments is 248 bytes, and a difference between the first and the third segments is 8 bytes. As such, none of the differences is greater than the memory block size. Therefore, a difference between two of a quantity of segments are maintained to be equal to or less than the memory block size regardless of a packet size.

Figure 4:
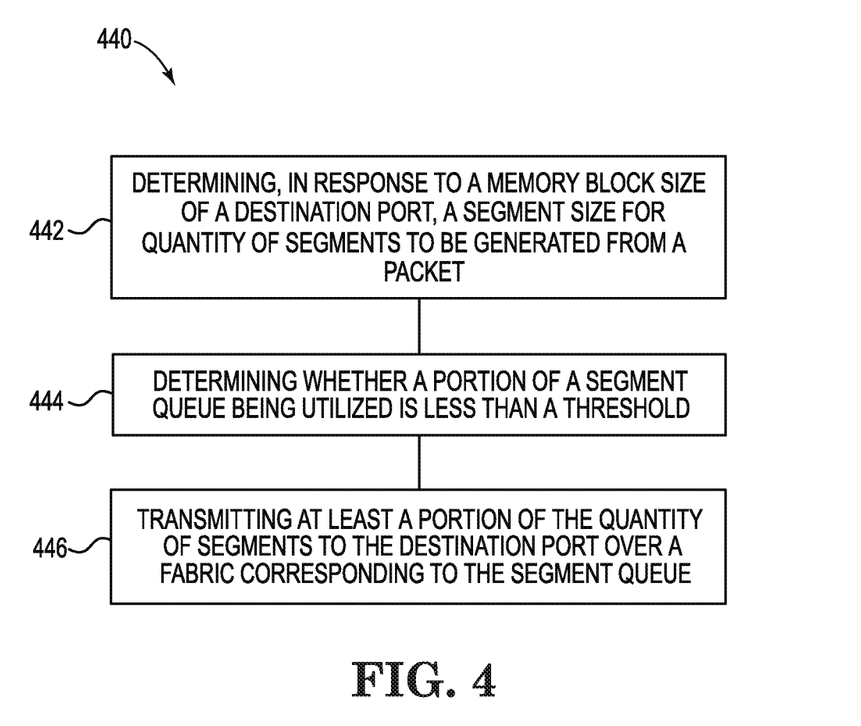
FIG. 4 illustrates a block diagram of an example method to determine a segment size in accordance with the disclosure.

FIG. 4 illustrates a block diagram of an example method 440 to determine a segment size in accordance with the disclosure. In some examples, the method 440 can be executed by a computing device or network device as described herein. For example, the method 440 can be executed by system 100 as referenced in FIG. 1.

At 442, the method 440 may include determining, in response to a memory block size of a destination port, a segment size for a quantity of segments to be generated from a packet. In various examples, a segment size for a quantity of segments may be determined, as described herein, for example, in relation to FIG. 2 and FIG. 3.

At 444, the method 440 may include determining whether a portion of a segment queue being utilized is less than a threshold. In some examples, a segment queue may be a segment first-in, first-out (FIFO), in which data units (e.g., segments) received at the segment FIFO may be exit the segment FIFO and transmitted to a corresponding fabric link in an order the data units are received at the segment FIFO. In various examples, the threshold may be altered to be equal to or less than a difference between a size of the segment queue and a target segment size such that a particular segment having a size that is equal to the target segment size is receivable at the corresponding segment queue determined to be available.

At 446, the method 440 may include transmitting at least a portion of the quantity of segments to the destination port over a fabric link corresponding to the determined segment queue. In various examples, available segment queues of a plurality of segment queues may each receive a single segment of the quantity of segments. As such, the quantity of segments generated from the packet are evenly distributed among the available segment queues such that each available segment queue is assigned (e.g., receives) a single (e.g., no more than one) segment at a time. Evenly distributing the quantity of segments among the available segment queues provides benefits such as avoiding a traffic congestion concentrated at a portion of fabric link and/or increased utilization of fabric link. In some examples, each single segment distributed among the available segment queues may comprise a same data size.

Figure 5:
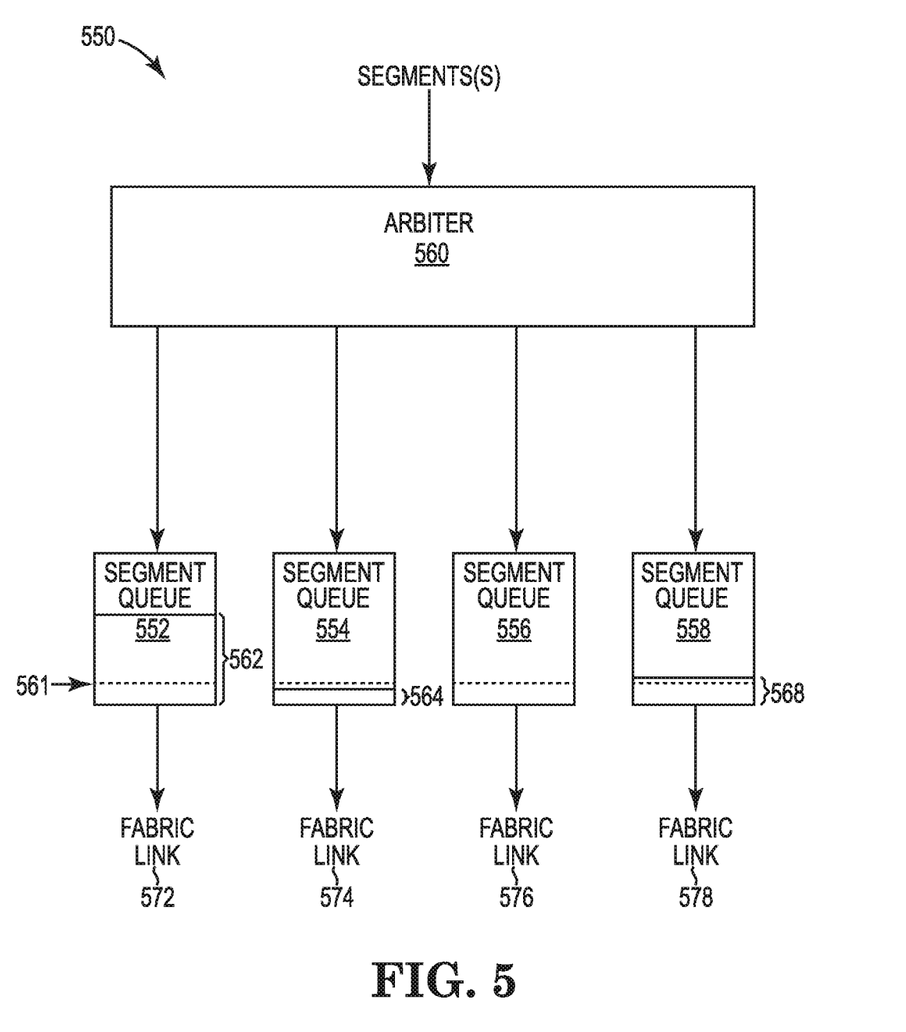
FIG. 5 illustrates a diagram of an example of a segment distribution in accordance with the disclosure.

FIG. 5 illustrates a diagram 550 of an example of a segment distribution in accordance with the disclosure. As shown in FIG. 5, an arbiter 560 is coupled to a plurality of segment queues 552, 554, 556, and 558, and each of the plurality of segment queues is coupled to a corresponding fabric link 572, 574, 576, and 578, respectively. Although four segment queues 552, 554, 556, and 558 and four corresponding fabric links 572, 574, 576, and 578 are illustrated, examples are not so limited.

In various examples, the arbiter 560 may be included in a network switch (e.g., fabric switch). In some examples, the network switch may be a crossbar switch that, for example, couples a plurality of inputs (e.g., a plurality of segments) to a plurality of outputs (e.g., a plurality of segment queues 572, 574, 576, and 578) in a matrix manner.

In various examples, the arbiter 560 may communicate with a plurality of segment queues to determine which segment queue is available to receive a segment. In some examples, the arbiter 560 may monitor an availability of each segment in a round-robin manner such that the availability of each segment may be periodically determined by the arbiter 560. In some example, the arbiter 560 may continuously monitor an availability of each segment such that a change in the availability of each segment may be immediately detected by the arbiter 560.

In various examples, a threshold 561 may be determined for a plurality of segment queues 552, 554, 556, and 558. The threshold 561 may be utilized to determine whether each of the plurality of segments 552, 554, 556, and 558 queues are available or not. For example, a portion of a segment queue that is being utilized less the threshold 561 may be determined to be available to receive a segment.

In an example shown in FIG. 5, segment queues 554 and 556 may be determined to be available. For example, a portion 564 of the segment queue 554 being utilized is less than the threshold 561, and the segment queue 556 is entirely available. Further, segment queues 552 and 558 may be determined to be not available. For example, a portion 562 of the segment queue 556 being utilized is above the threshold 561 and a portion 568 of the segment queue 558 being utilized is also above the threshold 561.

In various examples, the threshold 561 may be altered to be equal to or less than a difference between a size of the segment queue and a target segment size. This way, a particular segment, for example, having a size that is equal to the target segment size is receivable at the segment queue.

As shown in FIG. 5, the segment queue 554 is less available than the segment queue 556. For example, at least a portion 564 of the segment queue 554 is being utilized, and the segment queue 556 is entirely available to receive a segment.

In some examples, the arbiter may select a segment queue that is more available than other segment queues determined to be available. For example, the arbiter 560 may give priority to the segment queue 556 over the segment queue 554 such that, in a first arbitration cycle, the segment queue 556 may receive the segment, and the segment may be transmitted to a destination port over the fabric link 576. In this example, the arbiter 560 may perform a similar selection process again such that a particular segment queue (e.g., segment queue 554) that is more available than other segment queues may be given priority in a second arbitration cycle.

In some examples, the arbiter 560 may, in a first arbitration cycle, select the segment queue 554 that is determined less available than the segment queue 556. In this example, the arbiter 560 may give, in a second arbitration cycle, a priority to the segment queue 556 such that, in the second arbitration cycle, another segment may be transmitted over a fabric link 576 corresponding to the segment queue 556. As such, more than one segment queues may be determined by the arbiter 560 in a single arbitration cycle.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system, comprising:
   a processing resource; and
   a memory resource storing readable instructions which when executed by the processing resource cause the processing resource to:
   determine a number of segments to be generated from a packet based on a target segment size and a packet size; and
   alter a segment size for each segment based on the determined number of segments, a memory block size of a destination port, and a size of a remainder of the packet to be transmitted to the destination port.

2. The system of claim 1, wherein the altered segment size is equal to or greater than the memory block size.

3. The system of claim 1, wherein the memory block size of the destination port is equal to a block size of a memory buffer of the destination port.

4. The system of claim 1, wherein a size of each segment is determined to be less than or equal to the target segment size.

5. The system of claim 1, wherein each segment comprises a same data size.

6. The system of claim 5, wherein a last segment of the number of segments generated from the packet comprises a different data size than other segments of the quantity of segments.

7. A non-transitory machine readable medium comprising instructions which when executed by a processing resource cause the processing resource to:
   determine a number of segments to be generated from a packet based on a target segment size and a packet size; and
   select, among multiples of a memory block size of a destination port, a segment size for each of the number of segments to be generated from the packet; and
   alter a segment size for each segment based on the determined quantity number of segments, the memory block size of a destination port, and a size of a remainder of the packet to be transmitted to the destination port.

8. The non-transitory machine readable medium of claim 7, further comprising instructions to:
   divide the packet size by the target segment size to generate a plurality of division values; and
   round up the plurality of division values to a corresponding integer, wherein the integer is determined to be the number of segments to be generated from the packet.

9. The non-transitory machine readable medium of claim 7, further comprising instructions to:
   divide a size of a remainder of the packet by the memory block size to generate a first value, wherein the first value is rounded up to an integer to generate a block count value;
   divide the block count value by a remaining number of the number of segments to generate a second value, wherein the second value is rounded down to an integer to generate a segment value; and
   multiply the segment value by the memory block size to obtain a segment size.

10. The non-transitory machine readable medium of claim 9, further comprising instructions to:
    generate and transmit a segment having the determined segment size; and
    determine another segment size when a size of a remainder of the packet subsequent to the generation of the segment is greater than the target segment size.

11. The non-transitory machine readable medium of claim 7, further comprising instructions to transmit a remainder of the packet as a last segment when a size of the remainder of the packet is less than or equal to the target segment size, wherein the remainder of the packet is a portion of the packet that is yet to be segmented.

12. The non-transitory machine readable medium of claim 7, wherein a size difference between two of the number of segments is less than the memory block size, wherein the size difference is greater than zero.

13. The non-transitory machine readable medium of claim 7, further comprising instructions to transmit the packet as a single segment over the fabric when a packet size of the packet is less than or equal to a threshold.

14. A method, comprising:
    determining, by a computing device based on a memory block size of a destination port, a segment size for a number of segments to be generated from a packet;
    altering, by the computing device, a segment size for each segment based on the number of segments, the memory block size of the destination port, and a size of a remainder of the packet to be transmitted to the destination port;

determining, by the computing device, whether a portion of a segment queue being utilized is less than a threshold; and transmitting, by the computing device, at least a portion of the quantity of segments to the destination port over a fabric corresponding to the segment queue.

15. The method of claim 14, further comprising:

determining, by the computing device during a first arbitration cycle, that a first segment queue and a second segment queue are available, wherein the first segment queue is determined to be less available than the second segment queue;

transmitting, by the computing device, one of the quantity of segments over a first fabric corresponding to the first segment queue in the first arbitration cycle; and giving, by the computing device, a priority to the second segment queue in a second arbitration cycle such that another one of the quantity of segments is transmitted over a second fabric corresponding to the second segment queue in the second arbitration cycle.

16. The method of claim 14, further comprising:

determining, by the computing device during a first arbitration cycle, that a plurality of segment queues are available;

selecting, by the computing device, one of the plurality of segment queues that is more available than others of the plurality of segment queues; and transmitting, by the computing device, one of the number of segments over a fabric corresponding to the selected segment queue in the first arbitration cycle.

17. The method of claim 14, further comprising altering, by the computing device, the threshold to be equal to or less than a difference between a size of the segment queue and a target segment size such that a particular segment having a size that is equal to the target segment size is receivable at the corresponding segment queue determined to be available.

18. The method of claim 14, further comprising evenly distributing, by the computing device, the quantity of segments among a plurality of fabrics corresponding to a plurality of segment queues determined to be available.

19. The method of claim 14, further comprising assigning, by the computing device, a single one of the number of segments to each of a plurality of segments determined to be available.

* * * * *